United States Patent
Dahl

(10) Patent No.: US 12,398,036 B2
(45) Date of Patent: Aug. 26, 2025

(54) PROCESS FOR THE PRODUCTION OF SYNTHESIS GAS

(71) Applicant: Topsoe A/S, Kgs. Lyngby (DK)

(72) Inventor: Per Juul Dahl, Vedbæk (DK)

(73) Assignee: Topsoe A/S, Kgs. Lyngby (DK)

( * ) Notice: Subject to any disclaimer, the term of this patent is extended or adjusted under 35 U.S.C. 154(b) by 329 days.

(21) Appl. No.: 17/800,997

(22) PCT Filed: Mar. 1, 2021

(86) PCT No.: PCT/EP2021/055050
§ 371 (c)(1),
(2) Date: Aug. 19, 2022

(87) PCT Pub. No.: WO2021/175784
PCT Pub. Date: Sep. 10, 2021

(65) Prior Publication Data
US 2023/0121402 A1    Apr. 20, 2023

(30) Foreign Application Priority Data
Mar. 3, 2020    (DK) .......................... PA 2020 00270

(51) Int. Cl.
*C01B 3/48*    (2006.01)
*B01D 3/38*    (2006.01)
*C01B 3/50*    (2006.01)

(52) U.S. Cl.
CPC .................. *C01B 3/48* (2013.01); *B01D 3/38* (2013.01); *C01B 3/50* (2013.01);
(Continued)

(58) Field of Classification Search
CPC ..... C01B 3/48; C01B 3/50; C01B 2203/0205; C01B 2203/0283; C01B 2203/04;
(Continued)

(56) References Cited

U.S. PATENT DOCUMENTS 4,592,903 A * 6/1986 Osman .................. C01C 1/0405
                                                        423/652
4,681,603 A    7/1987 Spangler et al.
(Continued)

FOREIGN PATENT DOCUMENTS

EP        0 624 388 A1    11/1994
WO    WO 2018/162594 A1    9/2018

*Primary Examiner* — Jennifer Dieterle
*Assistant Examiner* — Phillip Y Shao
(74) *Attorney, Agent, or Firm* — Blank Rome LLP

(57) ABSTRACT

A process for producing synthesis gas, the process comprising the steps of a) reforming a hydrocarbon feed in a reforming section thereby obtaining a synthesis gas comprising CH4, CO, CO2, H2 and H2O and impurities comprising ammonia; b) shifting the synthesis gas in a shift section comprising one or more shift steps in series to a shifted synthesis gas; c) separating from the shifted synthesis gas a process condensate originating from cooling and optionally washing of the shifted synthesis gas; d) passing a part of the process condensate to a condensate steam stripper, wherein dissolved shift byproducts comprising ammonia, methanol and amines formed during shifting the synthesis gas are stripped out of the process condensate using steam resulting in a stripper steam stream, e) adding the stripper steam stream from the process condensate steam stripper to the hydrocarbon feed and/or to the synthesis gas downstream the reforming section, up-stream the last shift step, wherein the remaining part of the process condensate is purged.

9 Claims, 1 Drawing Sheet

(52) U.S. Cl.
CPC ............... *C01B 2203/0205* (2013.01); *C01B 2203/0283* (2013.01); *C01B 2203/04* (2013.01); *C01B 2203/148* (2013.01)

(58) Field of Classification Search
CPC ........ C01B 2203/148; C01B 2203/048; C01B 2203/0495; B01D 3/38; B01D 19/0015; Y02P 20/52
See application file for complete search history.

(56) References Cited

U.S. PATENT DOCUMENTS

| | | | | |
|---|---|---|---|---|
| 6,165,428 | A * | 12/2000 | Eijkhoudt | .............. B01J 20/103 |
| | | | | 95/902 |
| 6,900,247 | B2 * | 5/2005 | Price | ....................... C01B 3/501 |
| | | | | 518/703 |
| 2012/0273355 | A1 | 11/2012 | Farkas et al. | |
| 2015/0315020 | A1 | 11/2015 | Darde et al. | |
| 2016/0311734 | A1 * | 10/2016 | Mo | ....................... G01N 31/221 |
| 2017/0369313 | A1 | 12/2017 | Guillou et al. | |
| 2020/0231456 | A1 * | 7/2020 | Speth | ........................ C01B 3/48 |

* cited by examiner

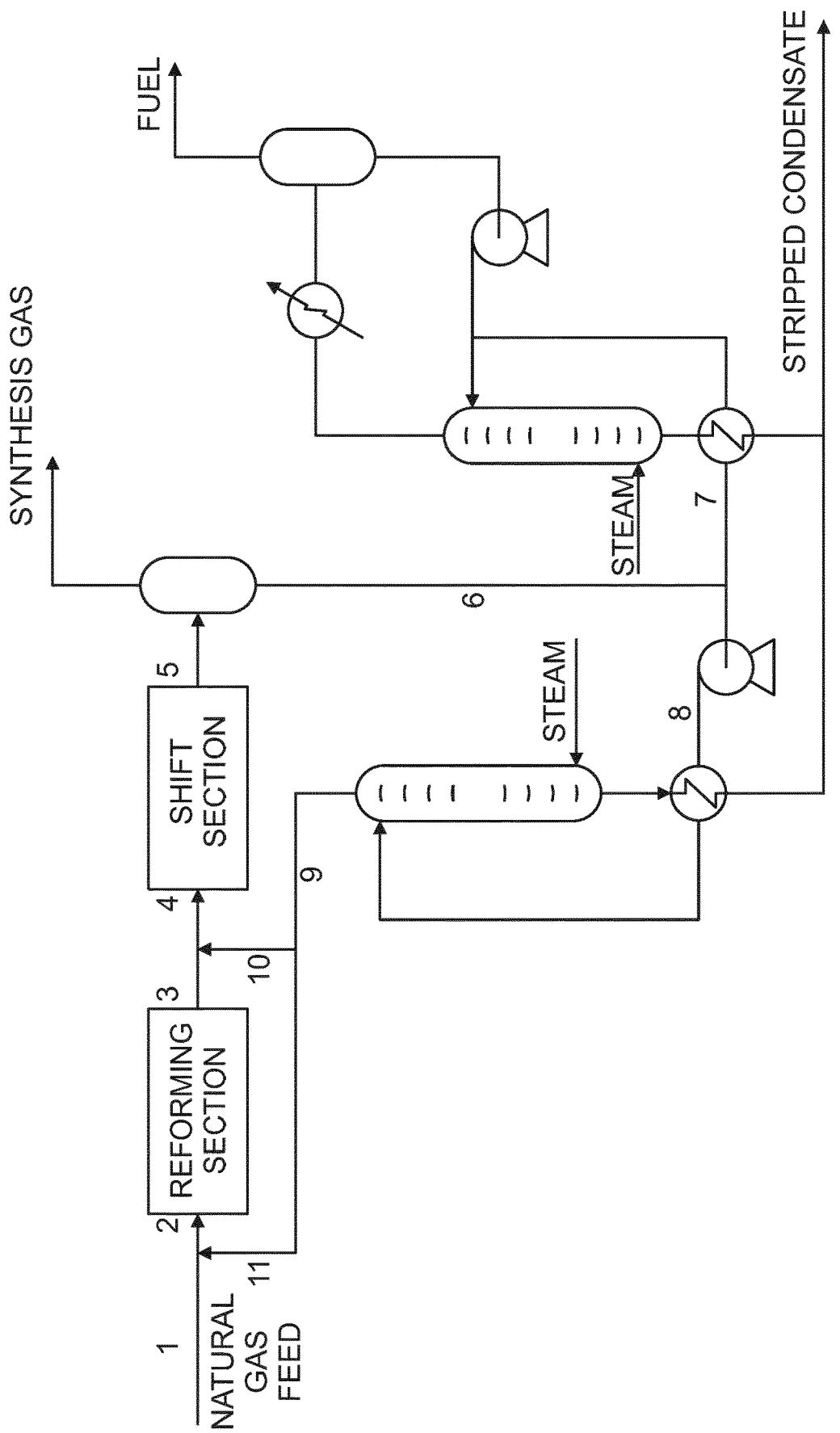

PROCESS FOR THE PRODUCTION OF SYNTHESIS GAS

The present invention relates to a process for the production of synthesis gas.

Synthesis gas is typically produced by reforming a hydrocarbon feed stock either by steam reforming (SMR), secondary reforming, such as autothermal reforming (ATR) and two-step reforming with SMR and ATR in series.

The synthesis gas leaving the reforming process contains hydrogen, carbon monoxide and carbon dioxide together with unconverted hydrocarbons, usually methane.

The synthesis gas contains additionally small amounts of nitrogen stemming from the hydrocarbon feed or from the air employed in the secondary or autothermal reformer.

The nitrogen will cause formation of ammonia in the reforming section corresponding to the conditions in the last reforming step. The ammonia formation is an equilibrium reaction In number of process applications, carbon monoxide and carbon dioxide contained in the synthesis gas from the reforming process must be removed prior to synthesis gas is introduced into the process. This is in particular true in the preparation of ammonia and hydrogen.

For this purpose, carbon monoxide is converted to carbon dioxide, which can be removed by known chemical or physical carbon dioxide processes.

Carbon monoxide is converted to carbon dioxide by passing the synthesis gas through a shift section where carbon monoxide is converted to carbon dioxide by the water gas shift process.

It is well known that a shift reaction cannot be performed without formation of by-products. Most Shift catalysts contain Cu. For these catalysts, one important by-product formed in the shift reaction is methanol. Methanol reacts to amines with ammonia formed in the reforming process from the nitrogen being present in the hydrocarbon feed and/or in air as mentioned hereinbefore.

The shifted synthesis gas is subsequent to the shift section cooled and passed into a condenser where process condensate is separated from the shifted synthesis gas.

The ammonia and amines contained in the shifted synthesis gas are condensed out together with the process condensate after the shift section.

Typically, the process condensate is send to a medium pressure (MP) steam stripper where dissolved gases inclusive ammonia and amines are stripped off with steam in order to allow the stripped condensate to be passed to boiler feed water (BFW) water treatment.

The medium pressure is defined as a pressure which is 0.5 bar, preferably 1 bar, higher than the pressure inlet the reforming section The steam exiting the steam stripper contains the dissolved gases and the ammonia and amines by-products. This so-called stripper stream is employed as part of or all the feed steam to the reforming section and as part of or all optional steam admitted to the process downstream the reforming section upstream the last shift reactor.

The amines react in the reforming section to $N_2$, $CO_2$, CO, $H_2$ and $H_2O$.

The ammonia and amines added downstream the reforming section upstream the last shift reactor will accumulate in the section and thus cause increased level of ammonia and amines in the process condensate. Newly formed ammonia is continuously admitted to the shift section from the reforming section. The formed amines and the residual ammonia will only be removed by stripper steam admitted to the reforming section.

A problem arises when the content of amines is high in the feed steam to the reforming section as this leads to carbon formation in the reforming section either in the preheat equipment or on the catalyst bed.

The invention solves this problem by purging the required part of the process condensate prior to the MP stripper thus reducing the amine level at inlet of the reforming section to an acceptable level.

The purge can be handled in a separate unit, for example a low pressure stripper from where the dissolved gases, ammonia and amines can be released as off-gas and can be used as fuel.

The low pressure is defined as a pressure which is lower than the pressure inlet the reforming section, for example 0.5 bar g to 20. bar g or 1.5 bar g to 10 bar g or preferably 2.0 bar g to 7. bar g In a further embodiment all stripper steam can be admitted downstream the reforming section upstream the last shift reactor. The built-up of ammonia and amines in the shift section will in this case be control by the rate of process condensate purge flow.

Thus, the invention is a process for producing synthesis gas, the A process for producing synthesis gas, the process comprising the steps of
  a) reforming a hydrocarbon feed in a reforming section thereby obtaining a synthesis gas comprising CH4, CO, CO2, H2 and H2O and impurities comprising ammonia;
  b) shifting the synthesis gas in a shift section comprising one or more shift steps in series to a shifted synthesis gas;
  c) separating from the shifted synthesis gas a process condensate originating from cooling and optionally washing of the shifted synthesis gas;
  d) passing a part of the process condensate to a condensate steam stripper, wherein dissolved shift byproducts comprising ammonia, methanol and amines formed during shifting the synthesis gas are stripped out of the process condensate using steam resulting in a stripper steam stream,
  e) adding the stripper steam stream from the process condensate steam stripper to the hydrocarbon feed and/or to the synthesis gas downstream the reforming section, upstream the last shift step, wherein the remaining part of the process condensate is purged.

In an embodiment of the invention, the remaining part of the process condensate is passed via a purge line to a purge condensate steam stripper.

The amount of purged condensate can be set to reject all or part of the amines from the stripper stream added to the hydrocarbon feed and/or to the synthesis gas in step (e). In case of partly rejection, remaining amines can be removed by admitting an acceptable level of amines to the reforming section via the condensate steam stripper.

In an embodiment of the invention, the condensate steam stripper is typically an MP stripper, as mentioned hereinbefore.

In further an embodiment, the purge condensate steam stripper is a low pressure stripper.

The stripper steam from purge condensate steam stripper is condensed and the resulting non-condensable gases containing amines, are advantageously employed as fuel for example in the reforming section and the liquid condensate is returned to the top of the low pressure stripper.

Thus, in an embodiment, steam from the purge gas steam stripper is condensed and non-condensable gases are employed as fuel.

The stripped condensate and the stripped purge condensate leave the bottom of the condensate steam stripper and purge condensate steam stripper and is send to water treatment.

The amount of the purge condensate is adjusted to remove all or part of the amines and ammonia formed in the reforming and shift section. In case of partly removal, remaining amines and ammonia can be removed by admitting an acceptable level of amines and ammonia to the reforming section via the stripper steam from the condensate steam stripper.

EXAMPLE

Reference is made to FIG. 1

The stream numbers in the tables below refers to the reference numbers in FIG. 1

Table 1 shows a case for removing formed ammonia and amines by converting these in the reforming section by adding 8.4% of the stripped steam to this unit.

Table 2 shows a case for removing formed ammonia and amines by purging 8% of the process condensate.

There is in both cases the same built-up of ammonia and amines in the shift section. This built-up can be reduced or removed by admitting all the stripped steam to either the reforming section or the process condensate purge.

TABLE 1

| Stream | 1 | 2 | 3 | 4 | 5 | 6 | 7 | 8 | 9 | 10 | 11 |
|---|---|---|---|---|---|---|---|---|---|---|---|
| Flow T/h | 92 | 100 | 168 | 255 | 255 | 125 | 0 | 125 | 95 | 87 | 8 |
| Ammonia Kg/g | 0 | 40 | 42 | 482 | 480 | 480 | 0 | 480 | 480 | 440 | 40 |
| Amines Kg/h | 0 | 3 | 0 | 33 | 36 | 36 | 0 | 36 | 36 | 33 | 3 |

TABLE 2

| Stream | 1 | 2 | 3 | 4 | 5 | 6 | 7 | 8 | 9 | 10 | 11 |
|---|---|---|---|---|---|---|---|---|---|---|---|
| Flow T/h | 100 | 100 | 168 | 255 | 255 | 125 | 10 | 115 | 87 | 87 | 0 |
| Ammonia Kg/g | 0 | 0 | 42 | 480 | 478 | 478 | 40 | 438 | 438 | 438 | 0 |
| Amines Kg/h | 0 | 0 | 0 | 33 | 36 | 36 | 3 | 33 | 33 | 33 | 0 |

The invention claimed is:

1. A process for producing synthesis gas, the process comprising:
   a) reforming a hydrocarbon feed in a reforming section having a pressure inlet to obtain a synthesis gas comprising $CH_4$, $CO$, $CO_2$, $H_2$ and $H_2O$ and impurities comprising ammonia;
   b) shifting the synthesis gas in a shift section comprising one or more shift steps in series to obtain a shifted synthesis gas;
   c) separating, from the shifted synthesis gas, a process condensate originating from cooling and optionally washing of the shifted synthesis gas;
   d) passing a part of the process condensate to a medium pressure condensate steam stripper, wherein the pressure of the medium pressure condensate steam stripper is higher than the pressure in the pressure inlet, and wherein dissolved shift byproducts comprising ammonia, methanol and amines formed during shifting of the synthesis gas are stripped out of the process condensate using steam to obtain a stripper steam stream; and
   e) adding the stripper steam stream to the hydrocarbon feed and/or to the synthesis gas downstream of the reforming section and upstream of the last shift step, wherein the remaining part of the process condensate is purged upstream of the medium pressure condensate steam stripper.

2. The process of claim 1, wherein the purge of the remaining part of the process condensate is passed to a purge condensate steam stripper.

3. The process of claim 2, wherein the purge condensate steam stripper is a low pressure purge condensate steam stripper, wherein the pressure of the low pressure purge condensate steam stripper is lower than the pressure of the pressure inlet.

4. The process of claim 2, wherein steam from the purge condensate steam stripper is condensed, and non-condensable gases are employed as fuel.

5. The process of claim 1, wherein stripped condensate from the medium pressure condensate steam stripper is passed to water treatment.

6. The process of claim 2, wherein stripped purge condensate from the purge condensate steam stripper is passed to water treatment.

7. The process of claim 1, wherein the pressure of the medium pressure condensate steam stripper is 0.5 bar higher than the pressure in the pressure inlet.

8. The process of claim 7, wherein the pressure of the medium pressure condensate steam stripper is 1.0 bar higher than the pressure in the pressure inlet.

9. The process of claim 3, wherein the pressure of the low pressure purge condensate steam stripper is from 0.5 bar to 20 bar.

* * * * *